(12) United States Patent
Taniguchi

(10) Patent No.: US 6,797,349 B2
(45) Date of Patent: Sep. 28, 2004

(54) HANDLED CONTAINER AND METHOD OF MOLDING THE SAME

(75) Inventor: Kou Taniguchi, Komoro (JP)

(73) Assignee: Nissei ASB Machine Co., Ltd., Komoro (JP)

( * ) Notice: Subject to any disclaimer, the term of this patent is extended or adjusted under 35 U.S.C. 154(b) by 0 days.

(21) Appl. No.: 10/374,797

(22) Filed: Feb. 25, 2003

(65) Prior Publication Data

US 2003/0148050 A1 Aug. 7, 2003

Related U.S. Application Data

(63) Continuation of application No. PCT/JP02/05220, filed on May 29, 2002.

(30) Foreign Application Priority Data

Jun. 8, 2001 (JP) ........................................ 2001-174310
Sep. 3, 2001 (JP) ........................................ 2001-265936

(51) Int. Cl.[7] .............................................. B65D 23/10
(52) U.S. Cl. ...................... 428/35.7; 264/150; 264/152; 264/516; 264/527; 264/534
(58) Field of Search .......................... 428/35.7; 264/150, 264/152, 516, 527, 534

(56) References Cited

U.S. PATENT DOCUMENTS

2003/0000640 A1 * 1/2003 Iizuka et al

FOREIGN PATENT DOCUMENTS

| JP | 31-15876 Y1 | 9/1956 |
| JP | 49-70779 A | 7/1974 |
| JP | 4-86737 | 7/1992 |
| JP | 2000-108195 A | 4/2000 |
| JP | 2000-335584 A | 12/2000 |

* cited by examiner

Primary Examiner—Sandra M. Nolan
(74) Attorney, Agent, or Firm—Burr & Brown

(57) ABSTRACT

A handled container includes: a container body formed by blow molding in a blow mold and having an inwardly depressed portion in a bottom portion; a carrying handle formed integrally with the container body by blow molding at a position corresponding to the depressed portion in the blow mold; and an insertion space formed between the handle and the bottom of the container body for inserting two or more fingers. The container body has a ground-contact portion which has a continuous shape and is formed in an outer periphery of the bottom portion; the depressed portion is formed by depressing the bottom portion of the container body inwardly from the ground-contact portion; and the handle is formed to be positioned inwardly from the ground-contact portion within the depressed portion of the container body.

16 Claims, 12 Drawing Sheets

HANDLED CONTAINER AND METHOD OF MOLDING THE SAME

Japanese Patent Application No. 2001-174310 filed on Jun. 8, 2001, Japanese Patent Application No. 2001-265936 filed on Sep. 3, 2001, and International Application No. PCT/JP02/05220 filed on May 29, 2002 are hereby incorporated by reference in their entirety.

BACKGROUND OF THE INVENTION

The present invention relates to a handled container such as a large-sized mineral water container and a method of molding such a handled container.

A large-sized mineral water container of synthetic resin material is generally known. Such a large-sized mineral water container usually has a capacity of 12 to 20 liters.

Such a large-sized mineral water container is delivered to and used in general homes and workplaces in North America and Central and South America. Each of the delivered mineral water containers is mounted upside down in a dispenser which has been installed in the house or workplace. Recently, the mineral water has been broadly used even in Japan. Thus, such large-sized mineral water containers are being delivered to houses and workplaces in Japan.

However, the large-sized mineral water containers filled with mineral water is very heavy and inconvenient in carrying. Particularly, when it is to be placed in the dispenser, a great effort is required. Various tools and devices for easily carrying the large-sized mineral water containers have been proposed.

Although various proposals for integrally forming a handle in a large-sized container through a direct blow molding process have been made, no container with a separate handle connected thereto through a blow molding process is not still proposed.

BRIEF SUMMARY OF THE INVENTION

An objective of the present invention is to provide a handled container which can be easily carried and placed into a dispenser by forming a container body integrally with a handle, and a method of molding such a handled container.

According to a first aspect of the present invention, there is provided a handled container comprising:

a container body formed by blow molding in a blow mold and having an inwardly depressed portion in a bottom portion;

a carrying handle formed integrally with the container body by the blow molding at a position corresponding to the depressed portion in the blow mold; and an insertion space formed between the handle and the bottom portion of the container body for inserting two or more fingers.

According to a second aspect of the present invention, there is provided a method of molding a handled container comprising:

inserting a handle at a bottom of a blow mold; and clamping the blow mold and blow-molding a preform into a container body having an inwardly depressed portion in a bottom portion of the container body, wherein the blow molding step includes a step of integrally molding the depressed portion of the container body with the handle.

According to the first and second aspects of the present invention, the handle can securely be integrated with the container body by blow molding the container body after the handle has been disposed at a bottom of the blow mold corresponding to the depressed portion. Since the insertion space is formed inside of the handle within the depressed portion, furthermore, fingers can be inserted into the insertion space so that an inverted container body can be lifted and carried by grasping the handle. Particularly, the container body can easily be placed into a generally used dispenser since the container is lifted and carried upside down. This is extremely convenient for large-sized containers.

Since the handle can be gasped by two or more fingers, any large-sized container filled with heavy contents can be easily carried.

In the handled container according to the first aspect of the present invention, the container body may have a ground-contact portion which has a continuous shape and is formed in an outer periphery of the bottom portion; the depressed portion may be formed by depressing the bottom portion of the container body inwardly from the ground-contact portion; and the handle may be formed to be positioned inwardly from the ground-contact portion within the depressed portion of the container body.

In the molding method according to the second aspect of the present invention, the container body may have a ground-contact portion which has a continuous shape and is formed in an outer periphery of the bottom portion; the depressed portion may be formed by depressing the bottom portion of the container body inwardly from the ground-contact portion; the blow mold may include a raised bottom mold corresponding to the depressed portion; and the handle may be disposed into the raised bottom mold in the inserting step.

Thus, by disposing the handle into the raised bottom mold and blow molding the container body, a ground-contact portion which has a continuous shape and is formed in an outer periphery of the bottom portion of the container body can be formed; and by depressing the bottom portion of the container body inwardly from the ground-contact portion, the depressed portion can be formed. Since the bottom of the container body is not easily deformed in the presence of the ground-contact portion having a continuous shape even when the container body is lifted through the grasped handle, the handle can securely be prevented from being separated from the bottom of the container body.

Since the handle is located inwardly from the ground-contact portion, the container body will not adversely be affected by the handle even when it is placed on the ground. Furthermore, the connection between the handle and the container body will not broken even when the container falls onto the ground, since the impact will not be transmitted directly to the handle.

In this handled container, the handle may have a grip, a reinforcement plate located substantially parallel to the grip, and a pair of arm portions which respectively connects opposite ends of the grip and the reinforcement plate. Moreover, the reinforcement plate may have a wide portion which has a width larger than the grip.

In such an arrangement, a space into which fingers can be inserted can securely be formed between the reinforcement plate and the grip. In addition, the reinforcement plate will not be distorted on blow molding since the reinforcement plate has its width larger than that of the grip and is supported by the blow mold on blow molding.

In the handled container according to the first aspect of the present invention, the container body may have a ground-contact portion formed in an outer periphery of the bottom portion; and the depressed portion may be formed by inwardly depressing the center of the bottom portion, a bottom of the depressed portion being parallel to the bottom portion of the container body, and the ground-contact portion being divided into two portions by the depressed portion.

In the method of molding a handled container according to the second aspect of the present invention, the container body may have a ground-contact portion formed in an outer periphery of the bottom portion; the depressed portion may be formed to extend across the ground-contact portion to divide the ground-contact portion in two portions; the blow mold may include split blow cavity molds having a bottom shape corresponding to the depressed portion and ground-contact portion; and the handle may be disposed into the split blow cavity molds in the inserting step.

In this configuration, the handled container can be molded without need of any raised bottom mold by performing the blow molding process after the handle has been inserted into the split blow cavity molds having a bottom shape corresponding to the depressed portion and ground-contact portion. This simplifies the structure of the blow mold.

In the handled container, the handle may be a rod-like member including a grip and projected engagement portions at the opposite ends of the grip; and the projected engagement portions may be engaged integrally with an inner wall of the depressed portion.

In this configuration, the bottom of the container body having the ground-contact portion divided in two by the depressed portion can be prevented from being deformed to separate it from the handle when the container body is lifted through the grasped handle.

In the handled container according to the first aspect of the present invention, the container body may have a ground-contact portion formed in an outer periphery of the bottom portion; and the depressed portion may be formed to extend from the substantial center of the bottom portion to part of the ground-contact portion, causing the ground-contact portion to have a substantially U-shape.

In the molding method according to the second aspect of the present invention, the container body may have a ground-contact portion formed in an outer periphery of the bottom portion; and the depressed portion may be formed to extend from the substantial center of the bottom portion to part of the ground-contact portion; the blow mold may include a pair of split blow cavity molds and a bottom mold for forming a central portion of the depressed portion; and one of the split blow cavity molds may form a portion for inserting the handle, and the split blow cavity mold and part of the bottom mold may support the handle in the inserting step.

In this configuration, the handle can be insert-molded without forming the handle into an annular configuration.

In this handled container, the handle may have a grip and a pair of arm portions extending from opposite ends of the grip; and both ends of the arm portions may be respectively formed to be integrated with substantially L-shaped projected engagement portions.

Thus, the handle will not be separated from the container body since there is the projected engagement portions in the handle that function as anti-removal means.

In the method of molding a handled container according to the second aspect of the present invention, the integrally molding step may be performed by transforming a resin of the preform corresponding to the bottom portion of the container body along the shape of the handle without stretching the resin in a direction opposite to the direction of longitudinal stretch.

Thus, the resin material of the preform can sufficiently be engaged with the handle at the bottom of the container body without stretching the resin material in the direction opposite to the longitudinally stretching direction of the preform as in engaging a handle with a barrel portion of a container. Thus, the handle can securely be formed integrally with the container body without easy removal of the handle.

In the method of molding a handled container according to the second aspect of the present invention, the integrally molding step may be performed by transforming a resin of the preform corresponding to the bottom portion of the container body along the shape of the handle, the resin being a relatively thick and having a large amount of heat.

Thus, the bottom of the container body will be blow molded without being substantially stretched unlike the container barrel. Therefore, the container bottom will have an increased thickness and an increased amount of heat. When the resin material is blow molded to be integrated with the handle in such a state, the handle can securely be integrated with the container body. As a result, the handle will not easily be removed from the container body.

DETAILED DESCRIPTION OF THE EMBODIMENTS

Several embodiments of the present invention will now be described in detail with reference to the drawings.

FIGS. 1 to 5 show a handled container formed according to the first embodiment of the present invention.

Figure 1:
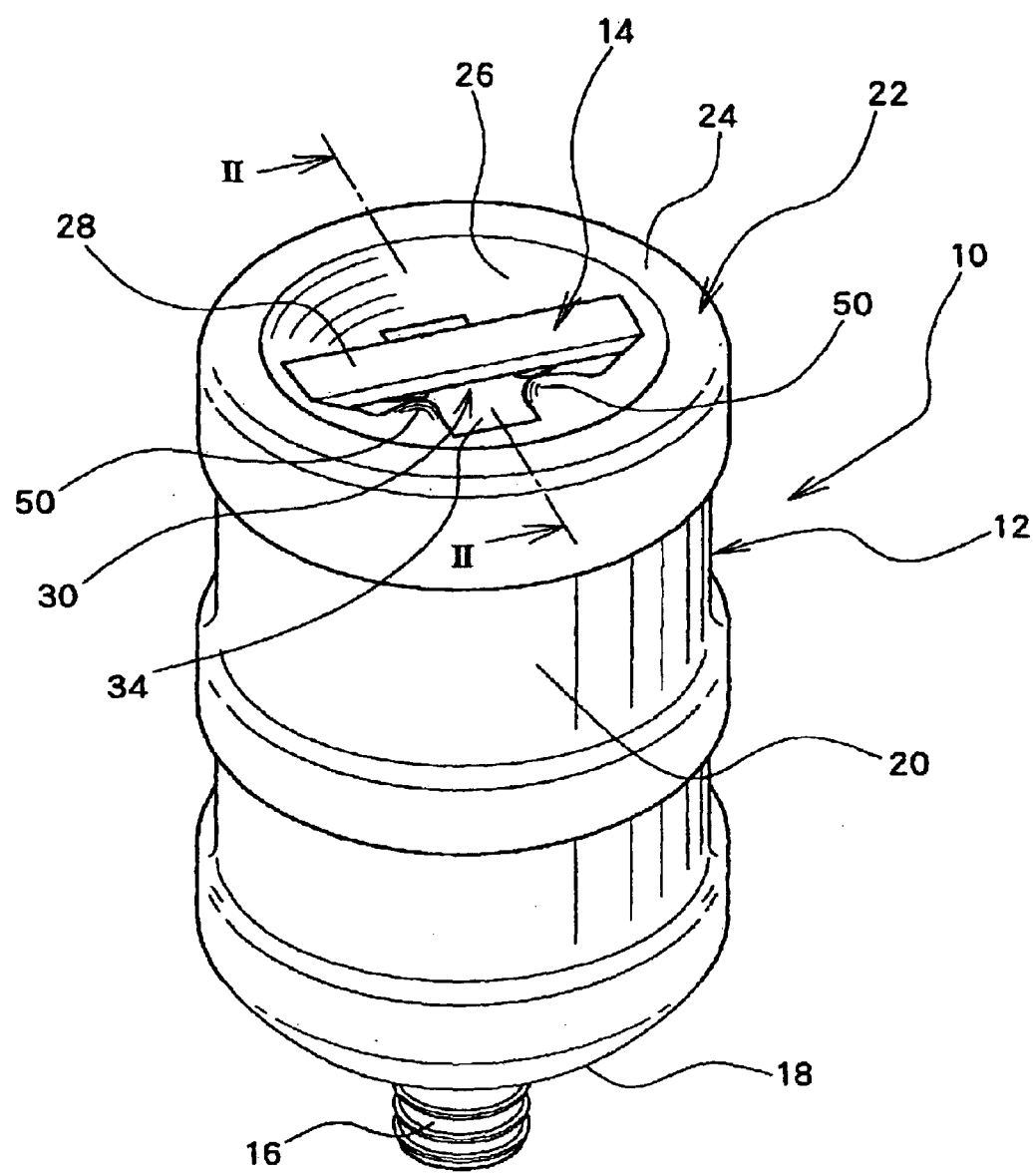
FIG. 1 is a perspective view of an inverted handled container according to a first embodiment of the present invention.

This handled container 10 may be a large-sized mineral water container having a capacity of about 12 to 20 liters, for example, a PET container formed by biaxial stretch blow molding. The handled container 10 has a container body 12 and a handle 14, as shown in FIG. 1.

The container body 12 includes an open-ended neck 16, a shoulder 18 connecting to the neck 16, a barrel portion 20 connecting to the shoulder 18 and a bottom portion 22 connecting to the barrel portion 20.

The bottom portion 22 has an annular ground-contact portion 24 formed thereon in an outer periphery of the bottom portion 22 and a depressed portion 26 having a dome shape and being depressed inwardly from the ground-contact portion 24 of the container body 12.

Figure 2:
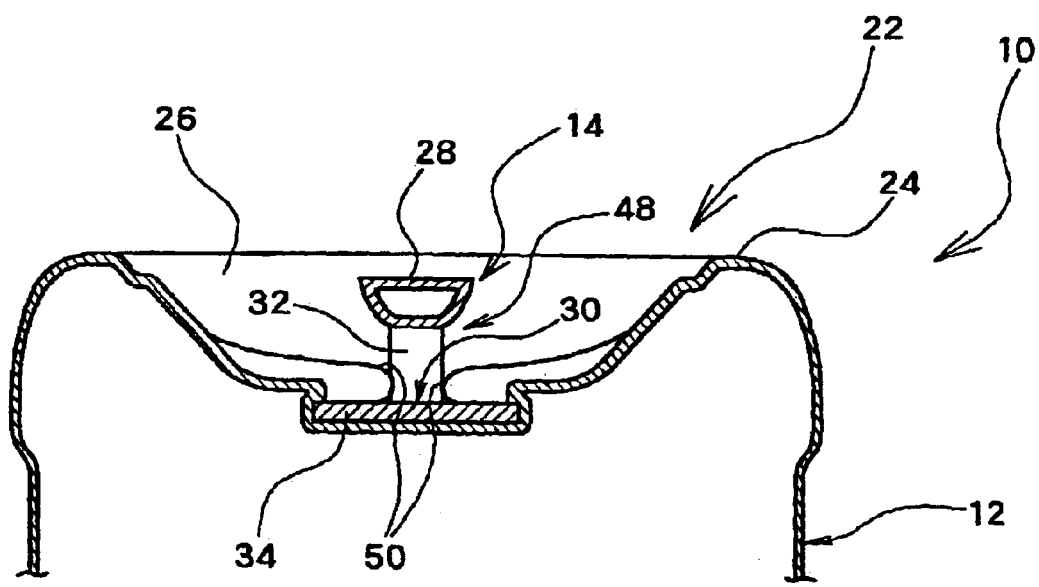
FIG. 2 is a partial cross-sectional view taken along the line II—II in FIG. 1.

The handle 14 is located within the depressed portion 26 formed in the bottom portion 22 at a position inwardly from the ground-contact portion 24, as shown in FIG. 2.

Figure 4A:
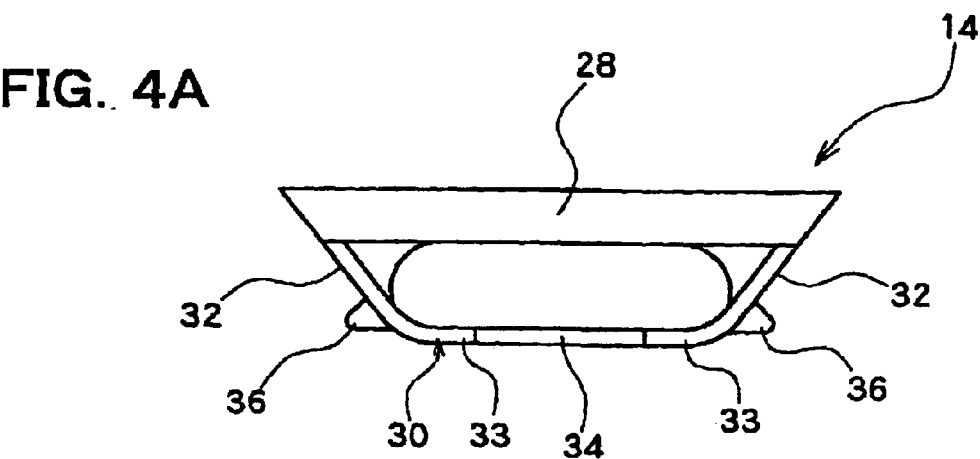
FIG. 4A is a front view of a handle.
Figure 4B:
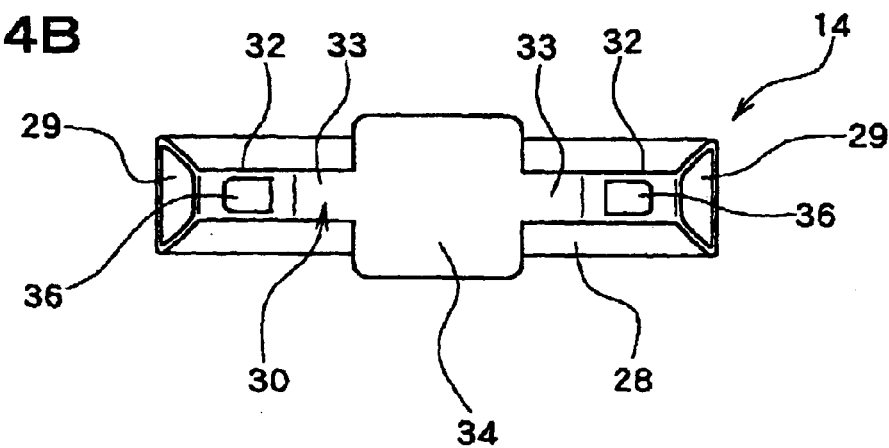
FIG. 4B is a bottom view of the handle.
Figure 4C:
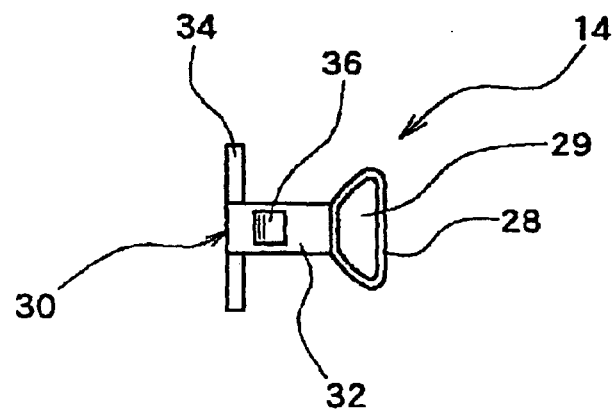
FIG. 4C is a side view of the handle.

As seen from FIGS. 4A to 4C, the handle 14 is of an annular configuration which has a grip 28 to be grasped, a pair of arm portions 32 extending from the opposite ends of the grip 28 toward a position at which they intersect each other, and a reinforcement plate 30 located between the pair of arm portions 32 and arranged substantially parallel to the grip 28.

The reinforcement plate 30 includes a wide portion 34 formed therein at its substantial center and having its width larger than the grip 28 and arm portions 32, and a pair of mounting portions 33 connecting the arm portions 32 with the opposite sides of the wide portion 34.

Projected engagement portions 36 for engaging the container body 12 are formed to extend outwardly from the respective arm portions 32 at their middle parts.

The grip 28 is a substantially linear sleeve-shaped configuration that has openings 29 formed at the opposite ends thereof (see FIGS. 4B and 4C). The grip 28 has a sufficient length to be grasped by two or more fingers (by four fingers, for example).

The grip 28 may have a plate-like member and a number of reinforcement ribs, rather than the sleeve-shaped configuration. In effect, the grip 28 is only required to be an easily graspable structure that will not easily be bent by the weight of the contents in the container.

The projected engagement portions 36 may be formed to extend from the top and bottom ends of the arm portions 32 or from the opposite ends of the grip 28, rather than outer extension from the middle parts of the arm portions 32.

Figure 3:
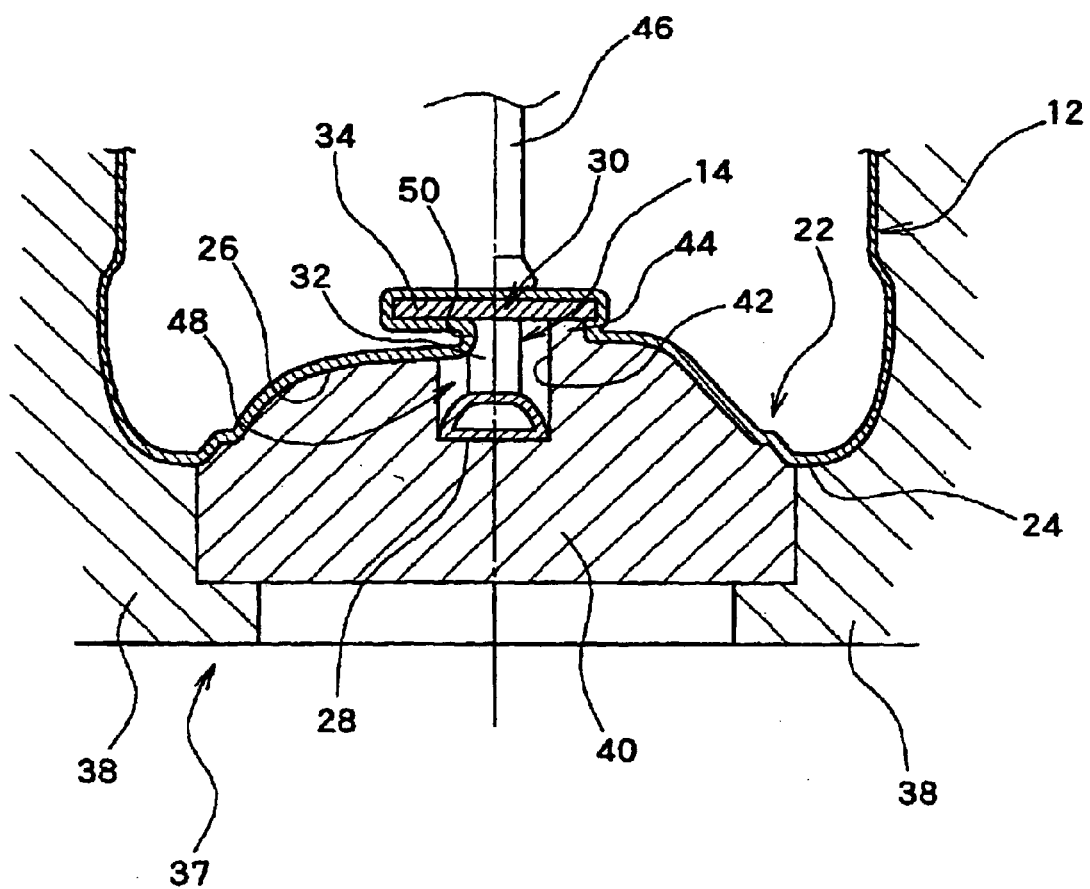
FIG. 3 is a partial cross-sectional view showing a state in which a handle is inserted into a bottom mold and is then subjected to biaxial stretch blow molding.

When such a handle 14 is to be mounted in the bottom portion 22 of the container body 12, the container body 12 is formed integrally with handle 14 by blow molding the container using a blow mold 37 shown in FIG. 3.

The blow mold 37 has a pair of blow cavity molds 38 and a raised bottom mold 40 incorporated onto the bottom of the blow mold 37. The raised bottom mold 40 includes an insert groove 42 used to insert the handle 14.

In the concrete, the grip 28 and arm portions 32 of the handle 14 are inserted into the insert groove 42 of the raised bottom mold 40 while the blow mold 37 is opened and before the container body 12 is subjected to biaxial stretch blow molding. In such an insertion, the projected engagement portions 36, mounting portions 33 and reinforcement plate 30 including the wide portion 34 are held exposed.

In such a case, the central part of the raised bottom mold 40 is formed with a support 44 for the wide portion 34 formed in the center of the reinforcement plate 30 as shown by FIG. 3 at its right side. In the remaining portion, there is a gap formed between the reinforcement plate 30 and the raised bottom mold 40, as shown by FIG. 3 at its left side.

In such an arrangement, the container is blow molded from a preform by introducing a high-pressure blow air thereinto at the same time or later when the preform is longitudinally stretched by a stretching rod 46.

In this case, the reinforcement plate 30 will not be flexed by a stretching force exerted onto the central part of the reinforcement plate 30 through the stretching rod 46. Thus, an insertion space 48 for inserting fingers can securely be formed between the grip 28 and the reinforcement plate 30.

At a position in which there is not the support 44 of the raised bottom mold 40, the resin material in the bottom portion 22 penetrates into the inside of the mounting portions 33 and/or wide portion 34 to form a rolled portion 50 through the pressure of the blow air, as shown in FIG. 3 at its left side. The rolled portion 50 can securely hold the mounting portions 33 that, in turn, can securely be connected integrally to the container body 12.

At the same time, the projected engagement portions 36 can also be engaged with an inner wall of the depressed portion 26 to provide a more secure engagement.

In addition, the wall of the depressed portion 26 penetrates into the openings 29 on the opposite ends of the grip 28 to provide a further secure engagement.

In such a case, the resin material of the preform may be rolled around the handle 14 at a position corresponding to the container bottom portion to provide an integral unit consisting of the handle 14 and depressed portion 26, without stretching the resin material in a direction opposite to the longitudinally stretching direction of the preform.

Namely, the resin material of the preform can sufficiently be rolled around the handle at the bottom portion 22 of the container body 12 even though the resin material is not rolled around the handle in the direction opposite to the longitudinally stretching direction of the preform. Such a rolling can securely connect the handle 14 integrally with the container body 12. Thus, the handle will not easily be removed or separated from the container body.

Furthermore, the handle 14 may securely be located within the depressed portion 26 of the container body 12 by rolling the resin material of the preform round the handle 14 at a position corresponding to the bottom of the preform which has a relatively large wall-thickness and in which an increased amount of heat is held.

In other words, the bottom portion 22 of the container body 12 will be blow molded without substantial stretch and with a clearance of several millimeters between the bottom end of the preform and the inserted handle, unlike the barrel portion 20 of the container body 12. Thus, the bottom portion 22 will have an increased wall-thickness and hold an increased amount of heat. When the resin material of the preform is rolled around the handle 14 in such a situation, the handle can more securely be connected integral with the container body 12 without easy removal.

When the resin material of the preform is rolled around the handle 13 at a position corresponding to the bottom portion 22 of the container body 12 and when the bottom portion 22 causes to engage the projected engagement portions 36 and the openings 29 of the grip 28, the hardly stretchable bottom portion 22 can more be stretched to increase the strength of the container.

Even though the handle 14 is mounted in the bottom portion 22 of the container body 12 in such a manner, the container body 12 can stably be placed on the ground without interference due to the handle 14 since the latter is positioned inwardly from the ground-contact portion 24 in the bottom portion 22 of the container body 12.

This also prevents the connection between the handle 14 and the container body 12 from being broken since any impact will not be transmitted directly to the handle 14.

Figure 5:
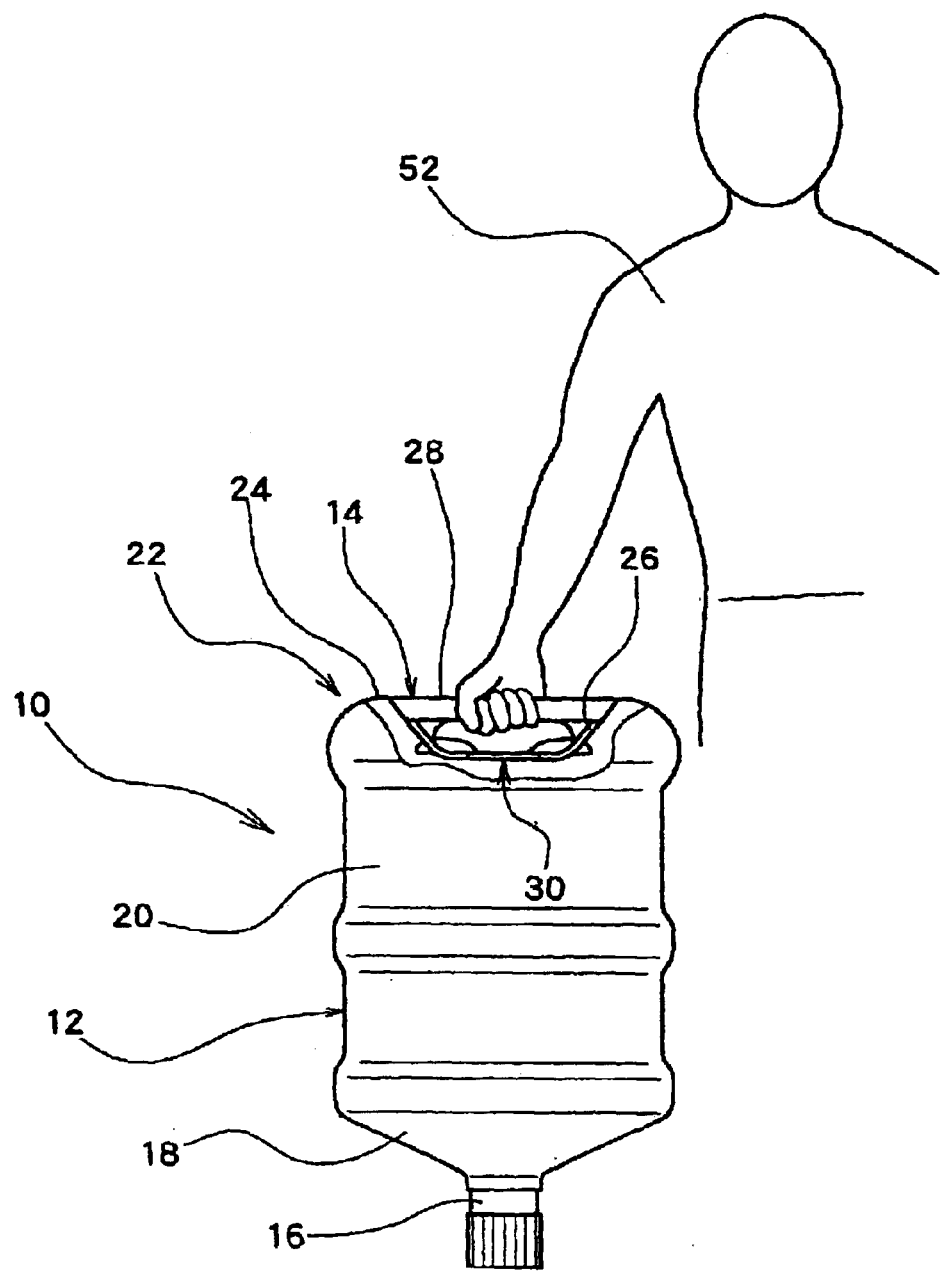
FIG. 5 is a schematic view showing a handled container being carried.

In carrying, the container body 12 is positioned upside down and carried by an operator 52 by grasping the grip 28 of the handle 14 in the bottom portion 22 of the container body 12, as shown in FIG. 5. Since the linear grip 28 can be grasped by two or more fingers and the depressed portion 26 has a sufficient depth, the container body 12 can extremely easily be carried by securely grasping the grip 38 by all fingers. Particularly, when the container body 12 is to be placed in a dispenser or the like, it can more easily be located in the dispenser without re-positioning.

Since the bottom portion 22 of the container body 12 has the circumferentially continuous ground-contact portion 24, the bottom portion 22 will not easily be deformed even when the container body 12 is lifted through the grasped grip 28. This also prevents the handle 14 from being easily removed from the container body 12.

Figure 6:
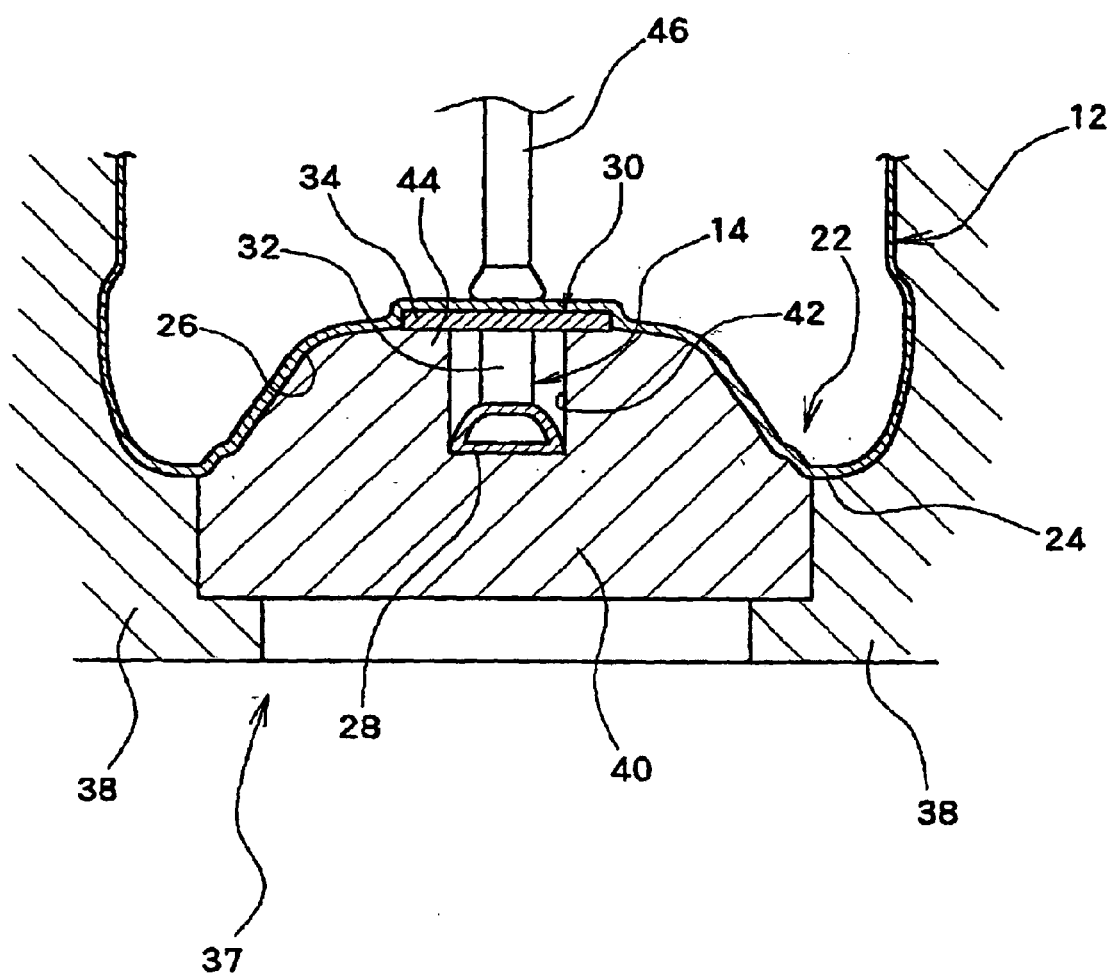
FIG. 6 is a partial cross-sectional view showing a blow-molded handled container according to a second embodiment of the present invention.

FIG. 6 shows a handled container formed according to the second embodiment of the present invention.

This handled container 10 uses a handle 14 similar in form to the handle according to the previous embodiment. However, it is different from the previous embodiment in that there is no rolled portion 50 round the mounting portions 33 and wide portion 34 of the handle 13 at the bottom portion 22 of the container body 12.

In the second embodiment, no gap will not be formed between the reinforcement plate 30 including the mounting portions 33 and wide portion 34 and the raised bottom mold 40 when the grip 28 and arm portions 32 of the handle 14 are inserted into the insert groove 42 of the raised bottom mold 40.

Therefore, the wall portion of the depressed portion 26 will not penetrate into below the mounting portions 33 and wide portion 34 when the container body 12 is blow molded. As a result, the insertion space 48 has a sufficient size. However, the fact that the wall portion of the depressed portion 26 engages the projected engagement portions 36 and is inserted integrally into the openings 29 on the opposite ends of the grip 28 is similar to that of the first embodiment.

The engagement between the container body 12 and the handle 14 is superior in that the projected engagement portions 36 on the handle 14 are visible. However, other forms of engagement can be used in the present invention without utilization of the depressed portion.

The other arrangements and functions will be omitted since they are similar to those of the previous embodiment.

Figure 7:
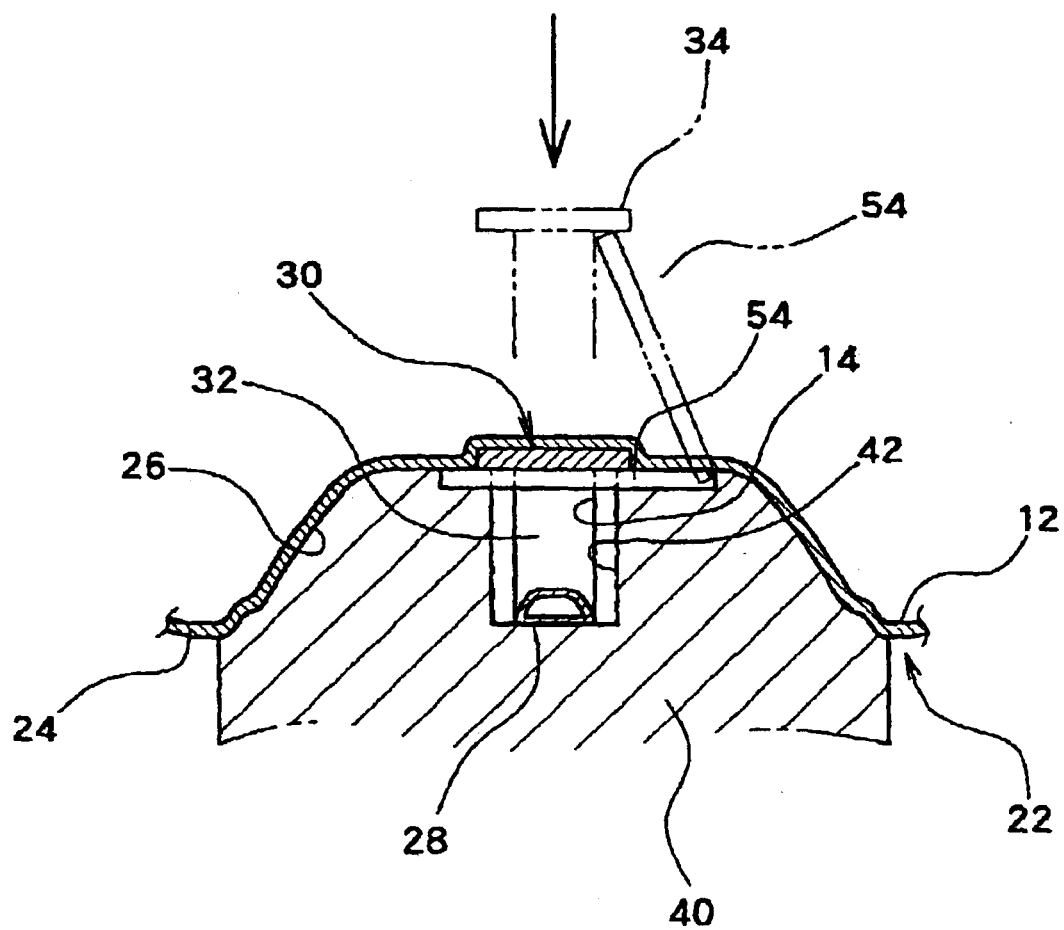
FIG. 7 is a partial cross-sectional view showing a blow-molded handled container according to a third embodiment of the present invention.

FIG. 7 shows a handled container according to the third embodiment of the present invention.

In the third embodiment, a closure 54 is mounted over the inlet portion of the insert groove 42 of the raised bottom mold 40 for forming the depressed portion 26 in the bottom portion 22 of the container body 12.

Usually, this closure 54 is positioned to open the insert groove 42 as shown by two-dot-chain line in FIG. 7.

When the handle 14 is inserted into the insert groove 42 with the grip 28 being downward directed, the grip 28 can be passed through the inlet of the insert groove 42 without interference of the opened closure 54. The reinforcement plate 30 larger in width than the grip 28 then engages the forward edge of the closure 54 and closes the closure 54. On termination of the insertion, the closure 54 will completely be closed with the reinforcement plate 30 being positioned thereover.

When the blow molding process is carried out in such a situation, the closure 54 will be subjected to the pressure from the stretching rod. Thus, the handle 14 can be connected integrally with the container body 12 while securing the insertion space in the depressed portion 26.

When the blow mold is opened, the closure 54 is automatically opened through the force from the raised bottom mold 40. Thus, the handle 14 can be separated from the raised bottom mold 40.

By thus using the closure 54, the reinforcement plate 30 will not be very increased in size and yet required to have an increased strength.

Even if the reinforcement plate 30 is omitted and when any engagement means for the closure 54 is provided in the arm portions 32, similar advantage can be provided.

The other arrangements and functions will be omitted since they are similar to those of the previous embodiments.

Figure 8:
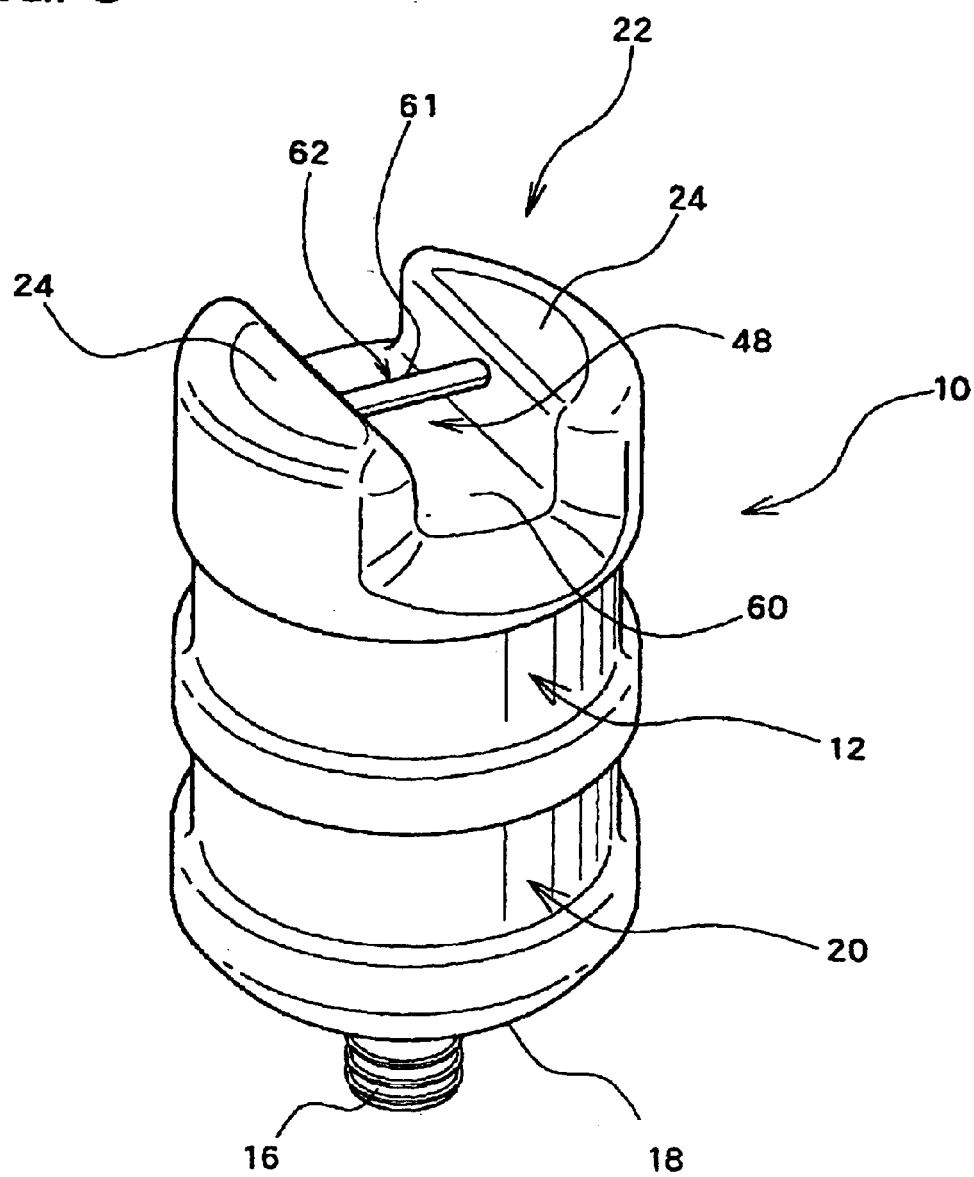
FIG. 8 is a perspective view of an inverted handled container in blow molding according to a fourth embodiment of the present invention.
Figure 9:
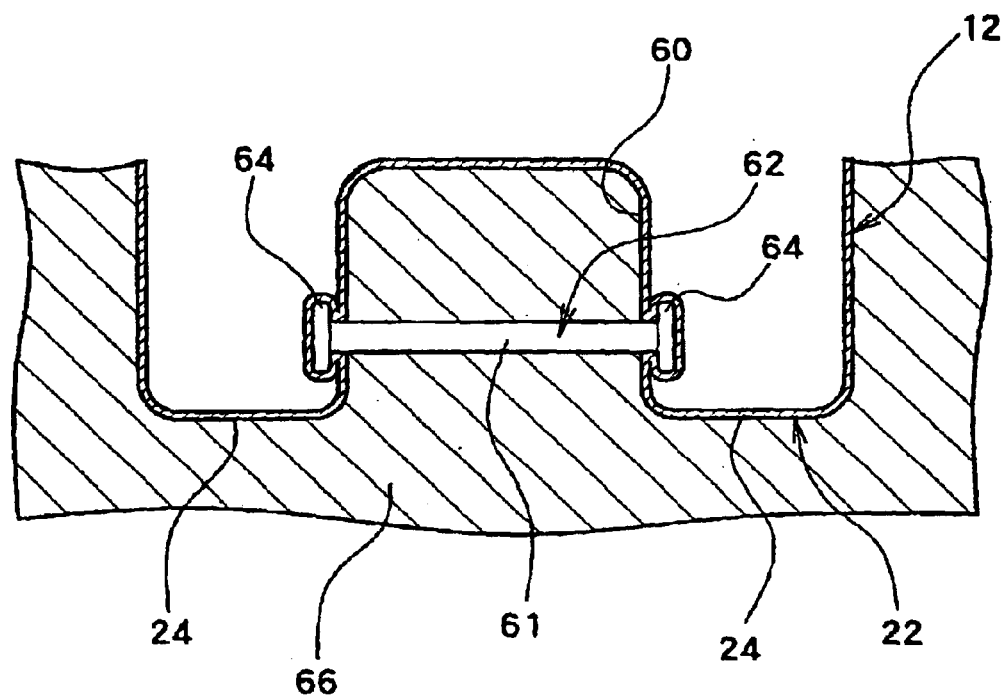
FIG. 9 is a partial cross-sectional view of the handled container shown in FIG. 8 in blow molding.

FIGS. 8 and 9 show a handled container according to the fourth embodiment of the present invention.

This handled container 10 has a rectangular depressed portion 60 diametrically extending across the ground-contact portion 24 on the outer periphery of the bottom portion 22 of the container body 12. Thus, the depressed portion 60 divides the ground-contact portion 24 in two.

A handle 62 spans the depressed portion 60 and has a grip 61 for lifting and carrying the container body 12. Thus, an insertion space 48 for inserting fingers is formed inside of the handle 62.

The handle 62 is of a substantially linear rod-like configuration and has its length larger than the grip 61. Thus, projected engagement portions 64 extending inside of the container body 12 are provided on the opposite ends of the handle 62. Each of the projected engagement portions 64 is engaged with part of the bottom portion 22 of the container body 12 (or inner wall of the depressed portion 60). Thus, the engagement can be secured.

Since the ground-contact portion 24 is bisected by the depressed portion 60, it is particularly preferred that each of the projected engagement portions 64 is formed to extend in the radial direction as shown in FIG. 9 so that the handle 62 will not be removed from the container body 12 by deforming the bottom portion 22 when the container body 12 is lifted by the grasped handle 62.

In the fourth embodiment, the depressed portion 60 is not undercut in a direction in which the blow cavity mold 66 is opened and closed. Thus, the blow cavity mold 66 can have its bottom configuration corresponding to the depressed portion 60 and ground-contact portion 24 as shown in FIG. 9, without utilization of any bottom mold moved in the longitudinal direction of the container body 21.

When the handle 62 is inserted into the blow cavity mold 66, the container body 12 can easily be blow molded to connect integrally with the grip 62. This can also simplify the structure of the blow mold.

If the grip 61 is inserted to be covered with the blow cavity mold, only the projected engagement portions 64 extend into the blow molding space. When the blow molding process is carried out in such a situation, the projected engagement portions 64 will be engaged with part of the bottom portion 22 of the container body 12.

In order to stably held the handle in the blow cavity mold 66 after insertion, any step (not shown) to engage the blow cavity mold may be provide in the grip 61. Furthermore, any vacuum means may be provided to prevent the handle from being unintentionally removed.

Figure 10:
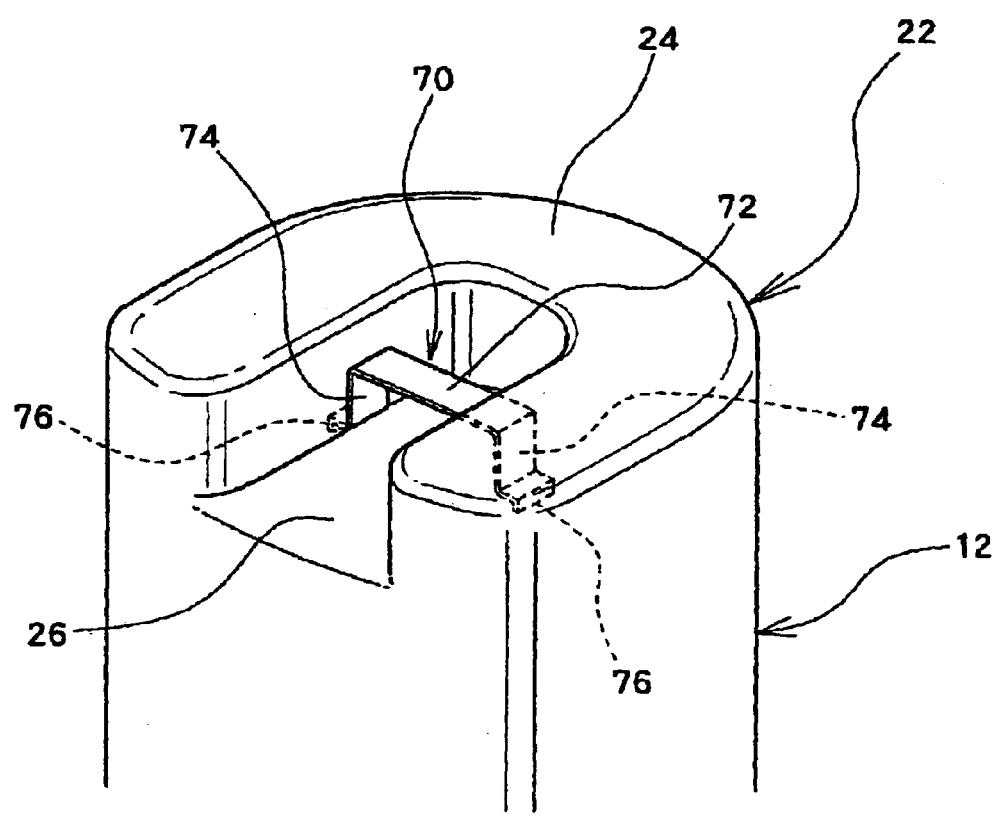
FIG. 10 is a partial perspective view of an inverted handled container according to a fifth embodiment of the present invention.
Figure 11:
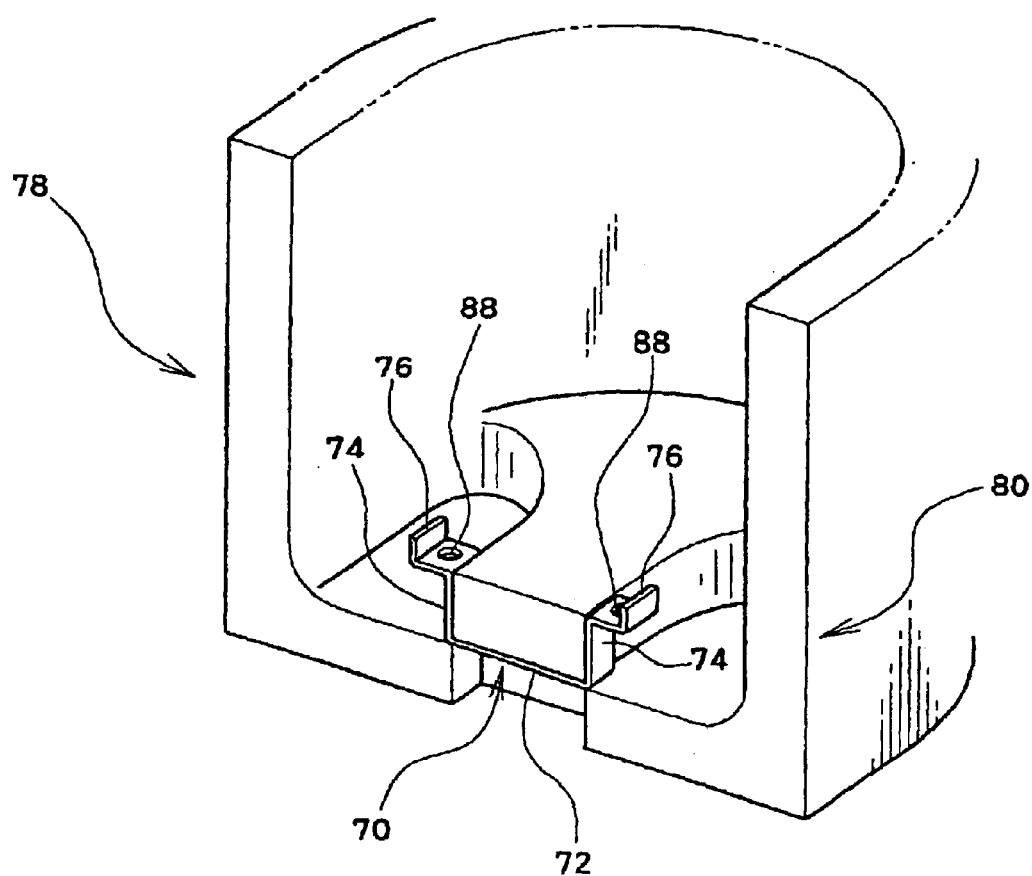
FIG. 11 is a partial perspective view of a handle inserted into a blow cavity mold for molding the handled container of FIG. 10.
Figure 12:
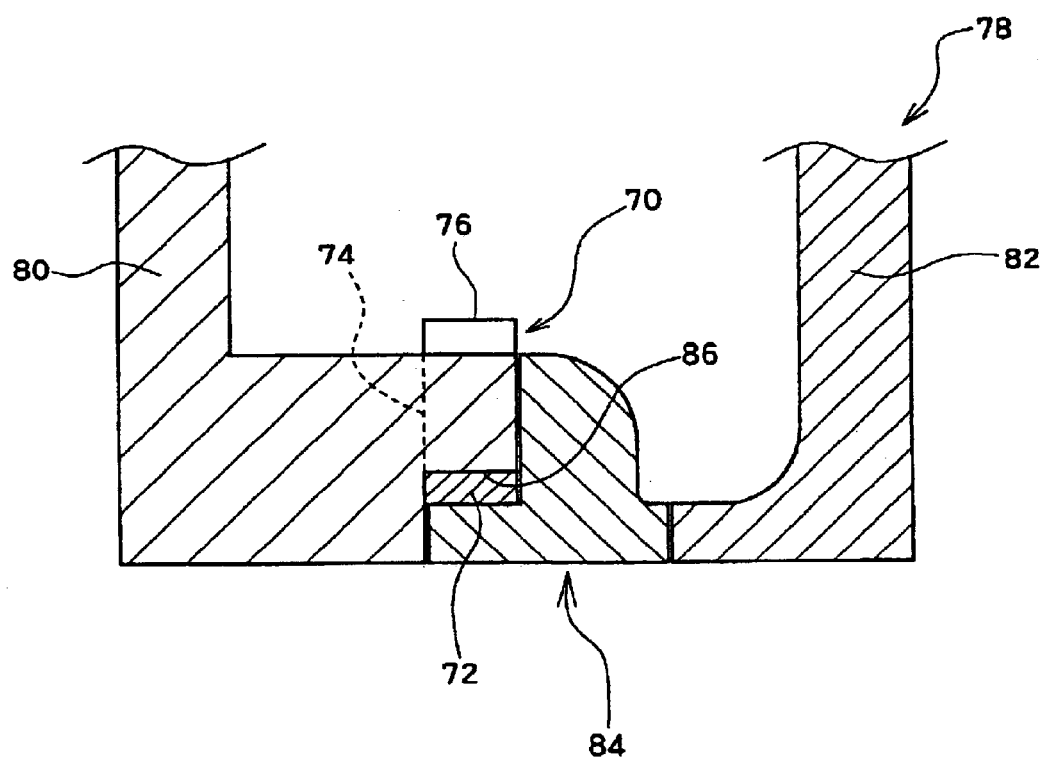
FIG. 12 is a partial cross-sectional view of a blow mold for molding the handled container of FIG. 10.

FIGS. 10 to 12 show a handled container according to the fifth embodiment of the present invention.

The container body 12 includes a ground-contact portion 24 formed along the outer periphery of the bottom portion 22. A depressed portion 26 is formed to extend from substantially the center of the bottom portion 22 along a part of the ground-contact portion 24. The ground-contact portion 24 is of substantially U-shaped configuration.

A handle 70 is mounted to span between the opposite sidewalls of the depressed portion 26 connecting to the ground-contact portion 24.

The handle 70 has a plate-like member having a grip 72 and a pair of arm portions 74 extending from the opposite ends of the grip 72. Both ends of the arm portions 74 are respectively formed to be integrated with substantially L-shaped and projected engagement portions 76.

In order to form such a handled container 10, such a blow mold 78 as shown in FIGS. 11 and 12 is used.

The blow mold 78 includes a pair of split blow cavity molds 80, 82 and a bottom mold 84 for forming the central portion of the depressed portion 26. The split blow cavity mold 80 is formed with an insertion portion 86 for receiving the handle 70 and adapted to hold the grip 72 of the handle 70 through the split blow cavity mold 80 and part of the bottom mold 84.

The projected engagement portions 76 of the handle 70 thus project into the blow molding space.

When the container body 12 is blow molded, an inner wall of the depressed portion 26 is engaged with the projected engagement portions 76 to connect the handle 70 integrally with the depressed portion 26 of the container body 12.

Each of the projected engagement portions 76 has an engagement hole 88 for more securely connecting the handle 70 with the container body 12, as shown in FIG. 11.

When the container body 12 is lifted by the grasped grip 72 in the handle 70, the handle 70 can securely be prevented from being removed from the container body 12 even though the bottom portion 22 of the container body 12 is deformed, since the projected engagement portions 76 of the handle 70 function as stops.

The other arrangements and functions are omitted since they are similar to those of the previous embodiments.

Although the grip of the handle has been described to be of a sleeve-shaped configuration in the embodiments of FIGS. 1 to 5, the grip may be of any shaped configuration such as a plate-shaped or rod-shaped configuration.

Although the grip has been described to be of a rod-shaped configuration in the embodiments shown in FIGS. 8 and 9, the grip may be of any configuration such as a plate-shaped or sleeve-shaped configuration.

Although the embodiment of FIGS. 10 and 12 has been described as to the plate-shaped grip of the handle, the grip may be of any configuration such as sleeve-shaped or rod-shaped configuration.

What is claimed is:

1. A handled container comprising:
   a container body formed by blow molding in a blow mold and having an inwardly depressed portion in a bottom portion;
   a carrying handle formed integrally with the container body by the blow molding at a position corresponding to the depressed portion in the blow mold; and
   an insertion space formed between the handle and the bottom portion of the container body for inserting two or more fingers.

2. The handled container as defined in claim 1, wherein:
   the container body has a ground-contact portion which has a continuous shape and is formed in an outer periphery of the bottom portion;
   the depressed portion is formed by depressing the bottom portion of the container body inwardly from the ground-contact portion; and
   the handle is formed to be positioned inwardly from the ground-contact portion within the depressed portion of the container body.

3. The handled container as defined in claim 2, wherein the handle has a grip, a reinforcement plate located substantially parallel to the grip, and a pair of arm portions which respectively connects opposite ends of the grip and the reinforcement plate.

4. The handled container as defined in claim 3, wherein the reinforcement plate has a wide portion which has a width larger than the grip.

5. The handled container as defined in claim 1, wherein:
   the container body has a ground-contact portion formed in an outer periphery of the bottom portion; and
   the depressed portion is formed by inwardly depressing the center of the bottom portion, a bottom of the depressed portion being parallel to the bottom portion of the container body, and the ground-contact portion being divided into two portions by the depressed portion.

6. The handled container as defined in claim 5, wherein:
   the handle is a rod-like member including a grip and projected engagement portions at the opposite ends of the grip; and
   the projected engagement portions are engaged with an inner wall of the depressed portion.

7. The handled container as defined in claim 1, wherein:
   the container body has a ground-contact portion formed in an outer periphery of the bottom portion; and
   the depressed portion is formed to extend from the substantial center of the bottom portion to part of the ground-contact portion, causing the ground-contact portion to have a substantially U-shape.

8. The container body as defined in claim 7, wherein:
   the handle has a grip and a pair of arm portions extending from opposite ends of the grip; and
   both ends of the arm portions are respectively formed to be integrated with substantially L-shaped projected engagement portions.

9. A method of molding a handled container comprising:
   inserting a handle at a bottom of a blow mold; and
   clamping the blow mold and blow-molding a preform into a container body having an inwardly depressed portion in a bottom portion of the container body,
   wherein the blow molding step includes a step of integrally molding the depressed portion of the container body with the handle.

10. The method as defined in claim 9, wherein:
    the container body has a ground-contact portion which has a continuous shape and is formed in an outer periphery of the bottom portion;

the depressed portion is formed by depressing the bottom portion of the container body inwardly from the ground-contact portion;

the blow mold includes a raised bottom mold corresponding to the depressed portion; and the handle is disposed into the raised bottom mold in the inserting step.

11. The method as defined in claim 9, wherein:

the container body has a ground-contact portion formed in an outer periphery of the bottom portion;

the depressed portion is formed to extend across the ground-contact portion to divide the ground-contact portion in two portions;

the blow mold includes split blow cavity molds having a bottom shape corresponding to the depressed portion and ground-contact portion; and the handle is disposed into the split blow cavity molds in the inserting step.

12. The method as defined in claim 11, wherein:

the handle is a rod-like member including a grip and projected engagement portions at the opposite ends of the grip; and the projected engagement portions are engaged integrally with an inner wall of the depressed portion in the blow molding step.

13. The method as defined in claim 9, wherein:

the container body has a ground-contact portion formed in an outer periphery of the bottom portion;

the depressed portion is formed to extend from the substantial center of the bottom portion to part of the ground-contact portion;

the blow mold includes a pair of split blow cavity molds and a bottom mold for forming a central portion of the depressed portion; and one of the split blow cavity molds forms a portion for inserting the handle, and the split blow cavity mold and part of the bottom mold support the handle in the inserting step.

14. The method as defined in claim 13, wherein:

the handle has a grip and a pair of arm portions extending from opposite ends of the grip; and both ends of the arm portions are respectively formed to be integrated with substantially L-shaped projected engagement portions.

15. The method as defined in claim 9, wherein the integrally molding step is performed by transforming a resin of the preform corresponding to the bottom portion of the container body along the shape of the handle without stretching the resin in a direction opposite to the direction of longitudinal stretch.

16. The method as defined in claim 9, wherein the integrally molding step is performed by transforming a resin of the preform corresponding to the bottom portion of the container body along the shape of the handle, such that the bottom portion contains the thickest resin of the container body.

* * * * *